(12) United States Patent
Sabarish

(10) Patent No.: US 10,956,595 B2
(45) Date of Patent: Mar. 23, 2021

(54) USER ACCESS MANAGEMENT FROM ANYWHERE AND PREVENT INTRUDERS BY NOTIFYING THE USERS AFTER A PREDETERMINED TIME INTERVAL

(71) Applicant: Super Auth, Inc., Tampa, FL (US)

(72) Inventor: Saranya Sabarish, Tampa, FL (US)

(73) Assignee: SUPER AUTH, INC., Tampa, FL (US)

( * ) Notice: Subject to any disclaimer, the term of this patent is extended or adjusted under 35 U.S.C. 154(b) by 136 days.

(21) Appl. No.: 15/998,764

(22) Filed: Aug. 16, 2018

(65) Prior Publication Data

US 2020/0057862 A1  Feb. 20, 2020

(51) Int. Cl.
| | |
|---|---|
| G06F 21/62 | (2013.01) |
| G06F 21/60 | (2013.01) |
| G06F 21/31 | (2013.01) |
| G06F 21/55 | (2013.01) |

(52) U.S. Cl.
CPC .......... G06F 21/6218 (2013.01); G06F 21/31 (2013.01); G06F 21/554 (2013.01); G06F 21/604 (2013.01)

(58) Field of Classification Search
None
See application file for complete search history.

(56) References Cited

U.S. PATENT DOCUMENTS

| | | | |
|---|---|---|---|
| 9,635,031 B2 | 4/2017 | Brown et al. | |
| 2010/0162371 A1 | 1/2010 | Geil | |
| 2011/0047033 A1* | 2/2011 | Mahaffey | H04L 63/14 705/14.66 |
| 2012/0297484 A1 | 11/2012 | Srivastava | |
| 2014/0171034 A1* | 6/2014 | Aleksin | G06Q 30/016 455/414.1 |
| 2015/0156183 A1* | 6/2015 | Beyer | H04L 63/08 726/4 |
| 2016/0066189 A1* | 3/2016 | Mahaffey | H04M 15/7652 455/405 |
| 2016/0127484 A1* | 5/2016 | Hornor | H04W 4/029 709/224 |
| 2017/0372055 A1* | 12/2017 | Robinson | H04W 12/06 |
| 2018/0375886 A1* | 12/2018 | Kirti | H04L 63/104 |

FOREIGN PATENT DOCUMENTS

| | | |
|---|---|---|
| CN | 101159624 B | 4/2011 |
| CN | 105844142 A | 8/2016 |
| IN | 0611/MUM/2005 A | 5/2005 |
| KR | 20060077141 A | 7/2006 |
| WO | 2016174261 A1 | 11/2016 |

* cited by examiner

*Primary Examiner* — Brandon S Hoffman
(74) *Attorney, Agent, or Firm* — Stanton IP Law Firm, P.A.

(57) ABSTRACT

Additional security is provided for users by implementing a module that notifies an account holder when the account is accessed to change in password, logout or lock the account via notifications to smartphone apps, browser plugin, etc. User can use mobile apps or browser plugin from any device to immediately stop the access by logging out the user from the already logged in systems, lock the user account, or change the password.

15 Claims, 5 Drawing Sheets

USER ACCESS MANAGEMENT FROM ANYWHERE AND PREVENT INTRUDERS BY NOTIFYING THE USERS AFTER A PREDETERMINED TIME INTERVAL

The research for the patent "User access management from anywhere and prevent intruders by notifying the users after a predetermined time interval" was not funded by any federally sponsored research or development.

BACKGROUND OF THE INVENTION

1. Field of the Invention

This invention relates generally to computer systems and mobile applications. More particularly, it relates to a security tool usable with email, phone, push notification to mobile applications, browser plugins and is capable of logging a user out of an application from anywhere.

2. Background of the Invention

Current on-line accounts rely on a strong password to prevent intruders from gaining access to an account. Some passwords require that they include both numbers and letters, and/or some require that they be of at least a given number of characters, e.g., at least 8 characters long, all to improve security, although that makes a password more difficult to recall. To assist, in the event of a forgotten password, a user may request that their password be sent to an email address registered when the account was initialized.

However, if a proper password is entered by an apparent user, conventional on-line account systems presume that the user is authorized. In this event, an unauthorized user of an on-line account may have hours to adulterate the account and may even be able to repeatedly return to the online account before the breach has been noticed and the password changed by a user of the online account.

The login system for conventional on-line account systems can be protected with multifactor authentication (MFA). A Common type of MFA is a two-factor authentication, where user gets a code via another predetermined means which is a onetime token and the token can change over time. Once user enters the code in the system, system will check whether the token matches the token generated by the system with same formula as used to generate the original token. However, hackers have developed methods to subvert these security measures and they can access the system without typing a password by using techniques such as session hijacking. Session hijacking, allows the hacker to get into the session after an authorized user has logged into their account and they use that to access the system to insert false credentials or misappropriate data. In this case, it is very difficult to know whether an illegal or legal user is accessing the system.

BRIEF SUMMARY OF THE INVENTION

The invention is applicable for use with any system to provide increased security for users to minimize the possibility of unauthorized access to a user's applications or systems such as operating system, database, website, mobile apps, cloud apps, computers, servers, Internet of things (IOT) devices, etc. The invention provides a layer of protection that safeguards the systems being surveilled to help identify unauthorized access and the invention's application notification means of user specified applications are alerted to any unauthorized access so that the user can take action to deny any unauthorized access. The invention provides the user of the system the ability to remotely logout unauthorized users, lock the account or change password from a single button click on the dashboard or mobile application associated with the invention. The system allows the authorized user to lock a user out of the account, logout, and change the password with a click of a button which provides them a powerful tool to protect their data and applications. The invention's login system can reside within the internet or not, similar to a computer login within an organization.

It is therefore a primary objective of the invention to provide a user management system which provides the registered user the ability to stop unauthorized users from accessing the applications or perform user management functions such as lock the account, logout the user, or change the password in the specified applications.

Another object of the invention is to provide a means for an authorized user to get the notifications not only for login but also as a result of any changes to the user account, such as change in password, lock the account, logout, etc.

Another objective of the invention is to prevent the ability of unauthorized users from changing passwords or notification means for specified applications.

Another objective of the invention is to thwart unauthorized logins by unauthorized users to specified applications.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Figure 1:
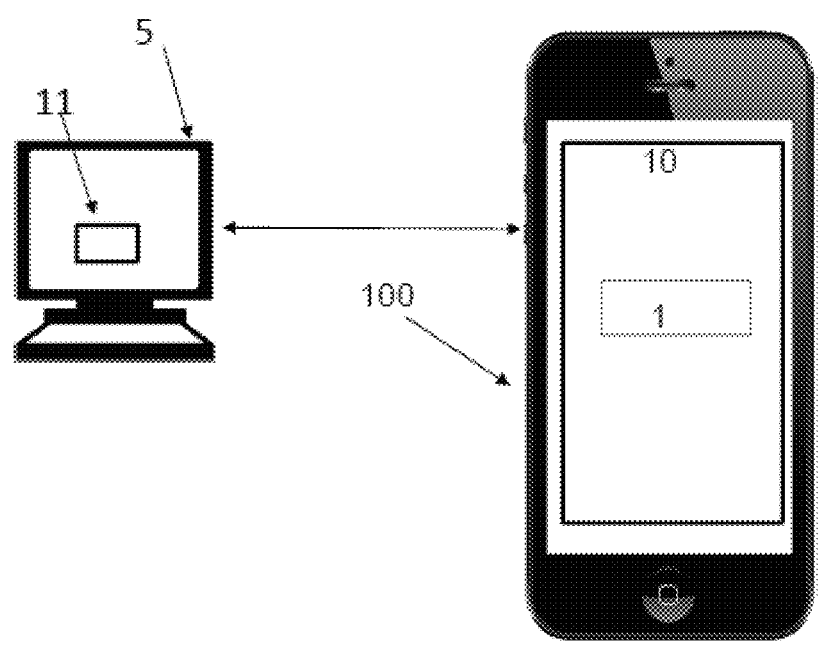
FIG. 1 depicts the relationship of application 1 and application 11 with respect to the invention.
Figure 2:
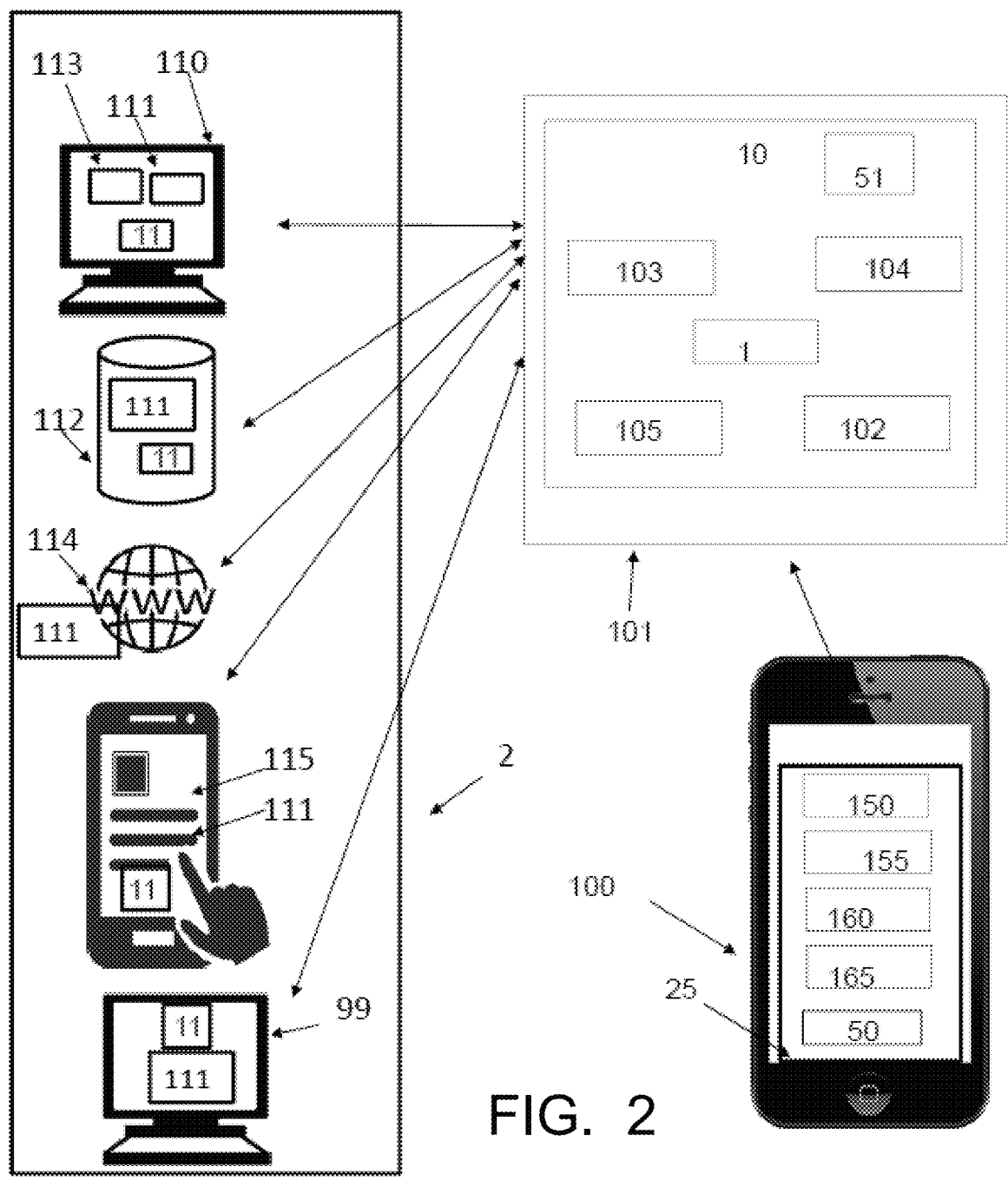
FIG. 2 depicts a user management server system in accordance with the principles of the present invention.
Figure 3:
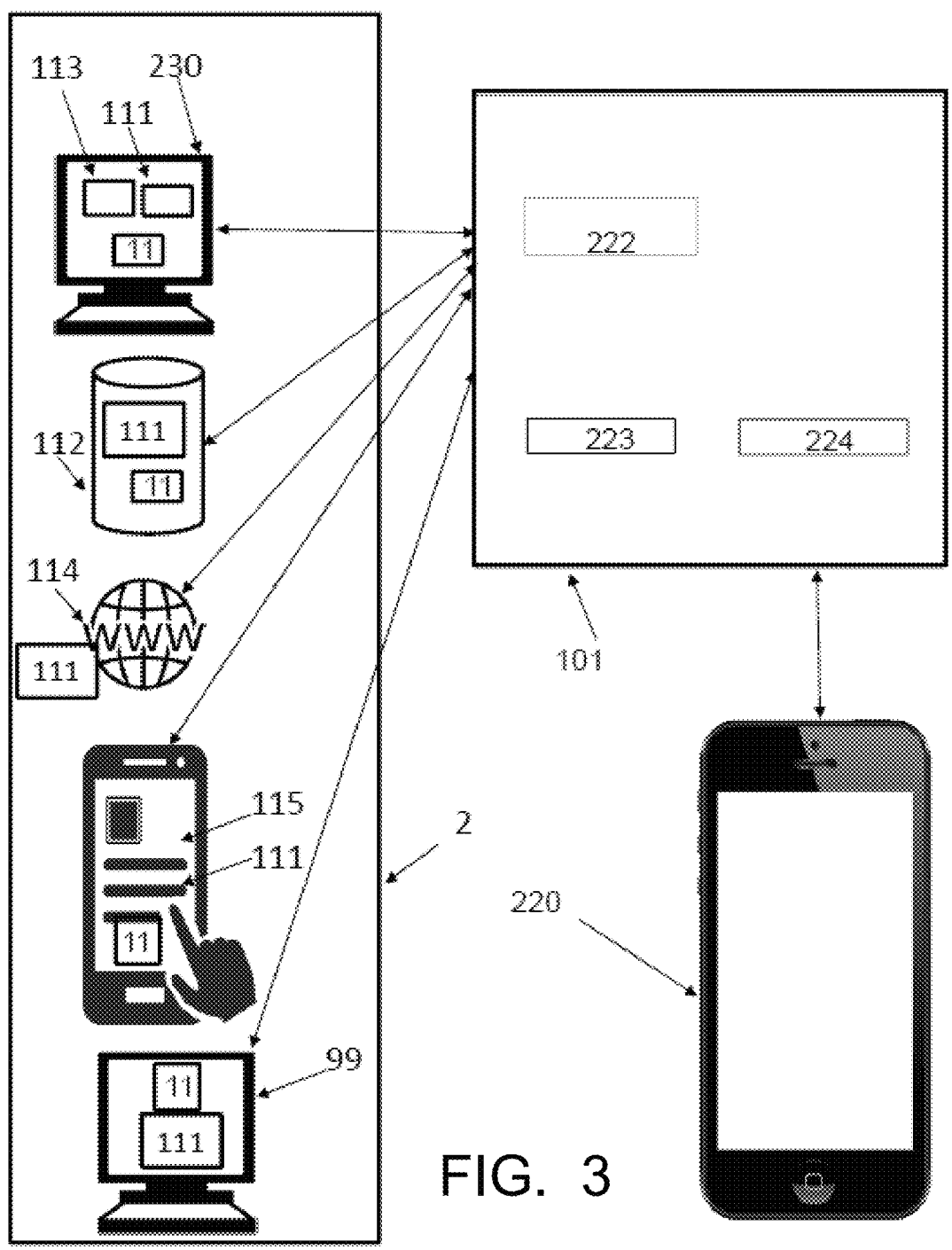
FIG. 3 depicts a user access management server system in accordance with the principles of the present invention.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The use of the term application when used is synonymous with program, module, system, and APP.

Currently hackers mainly use stolen, weak, or default passwords to login to systems. Hackers can also access the systems as legitimate users by using session hijacking methods to steal authorized login information or slip into an authorized session and change login information. It is difficult for current systems to know whether the user accessing the system is an authorized or unauthorized user. Therefore, the invention is designed to notify the authorized user of any access to the application or system after a first predetermined interval of time has expired after a monitored event has occurred such as after a login. The first predetermined amount of time being selected from the range comprising of 0 minutes to 48 hours.

The issue with unauthorized logins are not mitigated even if the user knows that the illegal user is accessing the system using their credentials because it is difficult to stop the illegal access. Often the unauthorized user will change the password and stop the legal user from accessing their account. To prevent this, the invention allows the user to perform the account management such as logout all his/her logins, lock his/her accounts for a certain period of time, change password, etc. from within the invention when the specified applications have integrated access modules which communicate with the invention from within their systems.

The invention when utilized with embedded modules in each application will allow the authorized user to perform account management such as logout of sessions, logins to sessions, lock their accounts for certain period, change password, change authorized user notification means such as cell phone numbers or email addresses, etc.

The invention addresses two main features which are needed to ensure the security of distributed user applications.

The invention allows the users to receive login or security information from any system, such as operating system, database, website, mobile apps, cloud apps, computers, servers, Internet of things (IOT) devices, etc., and the user can do any user management activities from the invention such as logout, lock the account for certain period of time, change password, etc. on any systems, such as operating system, database, website, mobile apps, etc. from any systems, such as mobile apps, browser plugins, websites, etc.

This invention allows the authorized user to not only get the notifications about the user account access in a predetermined interval of time or during login, but they can also receive notifications as a result of any changes to the user account, such as change in password, lock the account, logout, etc.

The invention when integrated into an operating system, database, website, mobile apps, cloud apps, computers, servers, Internet of things (IOT) devices, etc. will notify the user via a remote communication means utilizing standard protocols for their mobile app, browser plugin, email, SMS, etc. about the user account access in the interval of time or during login.

The invention is particularly suited to prevent an unknown party from changing the specific applications notification mechanisms because when the notification means for a specific application is changed the invention using the notifier module of the invention immediately sends a change notification including the new identifier such as email or phone number provided by the authorized user of record to notify them that the information with regards to the identifiers has been changed. This provides authorized user the ability to stop the modifications to the identifiers. The invention will notify the user using the notifier module of the invention by sending a message to the predetermine authorized user notification means such as an email, SMS text notification, push notification or other suitable predetermined means after first predetermined period of time has expired. The first predetermined amount of time being selected from the range comprising of 0 minutes to 48 hours. If the user does not object to the change by initiating a response, then the invention will stop sending the notifications to the user using the old notifier mechanism. Alternatively, when the invention has determined that the authorized user has not responded to the notification of a change then invention can be configured to send a second notification to the authorized user which notifies the authorized user of the corresponding access change by sending the notification a second time to both new and old identifiers such as phone number or email after a second predetermined period of time to ensure that the change is authorized. The second predetermined amount of time being selected from the range comprising of 0 minutes to 180 minutes.

The inventions notifier module is configurable such that it can utilize various notification means such as email, SMS text message, push notification to mobile apps or browser plugin, the managing system where the user has enabled the invention to verify the authorized user's identity.

After authorized user verifies their identity via predetermined email or phone verification in mobile apps or browser plugin, the user can subscribe to specific login notifications, user access notification, notifications when a user logs out, lock or change a password, logs into an application or session, etc. Once the authorized user has subscribed to login notification, the user can use the logout link, user account lock link, password change link, etc. which are display in the mobile apps or browser plugin to accomplish the appropriate actions for the specified application sending the login notification. The invention therefore also allows the authorized user to subscribe independently to login notifications and showing logout links for those systems. The invention can also display the links for each subscribed login. However, the login system may be limited due to the support provided by the specific application such that it only supports logout links or selected additional links. The features of the specific applications are based on the login system supporting features such as the mobile apps or browser plugin capability to display the appropriate links.

The invention works by installing an application specific module within the user application which is designed to specifically communicate with the system of the invention. Once the application specific module is installed it can communicate with the managing system of the invention and pass any security related changes to the system so the authorized user will be notified and then can use the managing system of the invention to remotely control the application security by logging out of the application, locking the user account, changing the password, changing security notification information, etc. and the actions will be displayed in the mobile apps or browser plugin to achieve the appropriate action by the authorized user.

From any system, such as mobile app, browser plugin, website, etc., the authorized user can do any user management activities such as logout, lock the account for certain period of time, change password, etc. to any systems, such as operating system, database, website, mobile apps, cloud apps, computers, servers, Internet of things (IOT) devices, etc. This defines the User Access Management from Anywhere module (UAMfA) which is part of the invention and resides in any authorized user system and is capable of managing the user information from a managing system module.

Prior to initiating the managing systems of the invention to monitor associated systems such as mobile app, browser plugin, website, etc., the authorized user needs to verify his identify. The authorized user can verify his identify by verifying his email, phone number, etc. by confirming the code that is sent to the user's email, phone, etc. or logging into the system, which the user wants to manage.

After user verifies their identity, they can add all the applications they want to manage, such as websites, mobile apps, enterprise systems, and any login to the managing system that they wanted to manage the user access information. Once they have added them to the managing system, the system information will be displayed in the managing system, such as mobile app, browser plugin, website, etc. so that the authorized user can view the notifications and manage the access information.

For some systems, such as an enterprise system, the user can manage different sub systems, such as servers, database, websites, etc. The user can also manage other users if that is required. In that case, once the user is verified in the managing system, the managing system sends the list of all systems and users that the user has identified to the managing system as authorized, such as mobile app, browser plugin, website, etc. and the managing system displays them on the managing system.

The next step is for the user to select the specific system or users that they want to manage in the managing system. The managing system displays the separate navigation buttons for each user management activities, such as logout all specific user logins, lock specific user accounts for certain period of time, change password, etc. The authorized user can manage his/her account or other user, if the managing system has been enabled to accommodate multiple accounts. Once the user selects the action desired, for example, logout for their account or any other user account, the managing system sends that information to the appropriate system where the application specific module validates whether the user has access to do that action for that specific system. If the user is authorized, then the module permits access and the application specific module can execute the desired action and logout user from that system immediately. The authorized user can also execute other actions similarly.

As described the application specific module can receive the instruction for a specific action from the user and initiate action from within the application specific module. The managing system can act as a consolidation system and send the action to the appropriate subsystem to perform the desired action.

When properly integrated the managing system module and the corresponding application specific modules are capable of notifying the authorized user of any access so that any unauthorized access is immediately identified.

Any systems, such as operating system, database, website, mobile apps, cloud apps, computers, servers, Internet of things (IOT) devices, etc. can notify the authorized user via a communication means, such as their mobile app, browser plugin, email, SMS, etc. about the user account access in the interval of time or during login. This allows the authorized user to not only get the notifications about the user account access in a predetermined interval of time or during login, but they can also receive notifications as a result of any changes to the user account, such as change in password, lock the account, logout, etc.

The User Access Management from Anywhere module (UAMfA) allows the authorized user to verify their identity from within the notification system, such as mobile app, browser plugin, etc., and select where they want to get the alarm notifications and proves a means to register with the managing system module. To receive the alarm notification via email, phone, etc. the authorized user needs to directly verify their identifier directly from within the system.

Therefore, an example of the process of used within the invention is that for push notification, the authorized user verifies their email address or phone number in the mobile application. User also verifies the same email or phone number in the managing system. Therefore, notifications can easily be sent from the managing system to the mobile applications, which is registered with the same email address or phone number.

Secondly, for push notifications, authorized user verifies their identity in the mobile app using authorization or login for the system, therefore, the system can store the mobile application identifier and send notifications to the specific mobile application.

Third the user can verify the email address or phone number directly in the system.

Whenever authorized or unauthorized user access of an application specific module is detected the module sends an alarm notification to the managing system module within a certain predetermined interval of time or after login, the system sends the notification to the appropriate user notification system or to an identifier using a preselected communication means such as email, SMS, etc. This allows the authorized user to not only get the notifications about the user account access in a predetermined interval of time or during login, but they can also receive notifications as a result of any changes to the user account, such as change in password, lock the account, logout, etc.

The application specific module can also send an alarm notification with regards to access to an application specific module to one or many users if required. The only requirement is that the specific users have been previously identified in the managing system module.

The application specific module can get the user access information from the managing system module or monitor the user access in the application specific module, and then send the notification to the users identified in the managing system module.

When the managing system module receives notification that the application specific module has recorded a changed to an authorized user notification identifier such as email address or phone number, then the application specific module will send the proper notification to the managing system module which will then send a notification using the notifier module of the invention to the authorized user by sending a message to the predetermine notifier means such as an email, SMS text notification, push notification or other suitable predetermined means after first predetermined period of time. The authorized user may then use the managing system to review the notification and then respond to it if it is an unauthorized user. The authorized user can then elect to stop sending the user access notifications, cancel the login, log the unauthorized user out, change the password, change the identifier such as email or phone number provided to the authorized user. To avoid the scenario where an unauthorized user has changed the identifier such as email or phone number provided by the authorized user, the system notifies the authorized user utilizing the application specific module that changes to the old identifiers have been made. The notification gives the authorized user the ability to stop the transaction, accept the transaction or log the user out. After a first predetermined period of time, if the user does not object to the change which was alerted from the application specific module, the managing system module will notify the application specific module to stop sending the notification to the old identifiers and record the event in an event log. The authorized user is empowered so they can also logout the unauthorized user, lock the application, etc, without receiving a notification if they so desire.

Using FIG. 1-5 as reference.

The present invention provides an easy and secure method to provide user access management for events such as, login, changing password, changing notification email, changing notification phone number, changing contact information, changing security questions, and changing alternate email address and the ability to react to these events by logging out, thereby terminating the user's access, lock the user account, change the user's password, etc.

By using the managing system module 111 on computer 110 and the corresponding application specific modules of the managing systems 111, such as operating any logon system 99, system 113, database 112, website 114, mobile apps 115, etc. identified as a group as item 2 from the managing system 100, such as server applications, computer applications, mobile app, browser plugin, website, etc. by implementing the user access management server (UAMS) 101 to handle user actions using modules the authorized user has control of the security aspects of the application specific modules identified as a group as item 2. To accomplish this the application 1 is installed on a managing system 100 which is part of managing systems module 10 and an application 11 is installed on device 5 and the managed application specific modules identified as a group as item 2 is either a database, server application, computer application, mobile app, browser plugin, website, etc. identified as a group as item 2. Application 11 monitors the application specific modules such as databases, server applications, computer applications, mobile app, browser plugin, website, etc. identified as a group as item 2 for events such as login, logout, change of notification, monitoring the user actions, such as login, logout, user access of the system beyond a time limit, lock the account, change password, etc. and will notify the authorized user via alarm notification systems 220 after a predetermined amount of time known as event time has transpired. The notification identifies to the authorized user that an event has occurred and will also identify the specific event that has occurred. The event time being selected from the range comprising of 0 minutes to 48 hours. The Application 11 notifies the authorized user that an event has occurred using communication methods such as mobile app, browser plugin, email, SMS, etc., where the authorized user is registered to receive the alarm notification. The application 1 and application 11 are the pivotal to the invention because numerous application 1 modules can send and receive information and notifications to and from numerous application 11 modules on the various applications being managed such as databases, server applications, computer applications, mobile app, browser plugin, cloud applications, servers, computers, website, etc. identified as a group as item 2. The alarm notifications from application 11 are sent to the application 1 after a first predetermined amount of time referred to as event time has elapse after the one of the monitored events has occurred. The event time can be selected from the range comprising of 0 minutes to 48 hours. The event is interpreted by the application 1 and the UAMS server 101 application 10 and an alarm notification is sent to the user using predetermined communication means selected from a mobile app or browser plugin, email, SMS, etc. and the authorized user can then apply actions to prevent the unauthorized modification to the application specific modules such as logout of the user's access, locking the user account, changing the user's password, changing the notification email, changing notification phone number, changing contact information, changing security questions, and changing alternate email address. If the user does not respond to the alarm notification within a predetermined time, then the management system will resend the alarm notification to alert the user. The user is capable of configuring the number of alarms to notify the user of unauthorized modification to the application specific modification. If the user does not respond to the last alarm notification, then the management system records the alarm notification and discontinues sending the notification to the user. The alarm notification timer can be set from 0 minutes to 180 minutes. Therefore, the managing system module 111 on computer 110 can inform the UAMS about any changes in the user access (e.g. website or active directory). Or, the UAMS can monitor the user access (e.g. database). The UAMS can also be implemented as a module inside any login.

Elaborating further the UAMS server 101 receives the user action from the managing system 100 and executes the action using modules logout 150, lock 155, change password 160 and user action module 165 in the managing systems 100 to control the actions of the UAMS server 101. UAMS server 101 when it receives and interprets the desired action, executes the action using the appropriate modules such as logout 103, lock 104, change password 105, and user action module 102 such that the appropriate actions are transmitted via applications 1 and 11 with respect to the mobile app, databases, server applications, computer applications, cloud applications, servers, computers, mobile app, browser plugin, website, identified as a group as item 2. The invention provides flexibility in that the user can use any number of managing systems 100 to manage the UAMS 101 server which in turn can manage multiple databases, server applications, computer applications, cloud applications, servers, computers, mobile app, browser plugin, website, etc. identified as a group as item 2.

When initiating the invention, the authorized user first verifies his identities in the managing system by verifying his email address, phone number, or other protected method such as biometrics or three-factor authentication technology. etc., which helps to identify the user in the managing systems 100. Optionally, authorized user can also login into managing system 100 or UAMS 101 server directly from managing system 100 to verify authorization to manage the user access in the managing system (UAMS) 101.

Once authorized user verifies his identity in the managing system 100, the authorized user adds the UAMS 101 server information. The UAMS 101 server information helps the managing system 100 to send the appropriate action/method calls to the UAMS 101 server. The commands are passed and acknowledge using application 1 and 11 respectively. A managing system 2 can itself act as a UAMS 101 server, for example a website, acts as a UAMS 101 server itself by implementing the user access management modules. A UAMS 101 server can be implemented as a separate server that connects to and manages different managing systems, for example an enterprise user management server 101 manages enterprise computers, servers, databases, websites, etc. However, to achieve integration in at least one application 1 on management server 101 and at least one application 11 installed and integrated into the databases, server applications, computer applications, cloud applications, servers, computers, mobile app, browser plugin, website, etc. identified as a group as item 2 which forms an integrated system. Once the user is added to the UAMS 101 server information in the managing system 100, the managing system 100 sends the request to the UAMS 101 with the user identifier 50 to get the list of managing systems 51 that connected with the UAMS 101 server, UAMS 101 server's User Action module 102 returns the list of managing systems such as the databases, server applications, computer applications, cloud applications, servers, computers, mobile app, browser plugin, website, etc. identified as a group as item 2 and that the users are authorized to manage and the user management actions, such as logout 103 the user's access, lock 104 the user account, change the user's password 105, etc., that user is authorized to do in each of the managing systems module 10. Then, managing systems 100 displays the list of managing systems for that user using managing APP 25. Managing system 100 can also get this managing systems authorized actions list from UAMS 101 anytime.

In the managing system 100, the authorize user can select the managing system that they want to manage anytime 301. The managing system 100 can display the managing system 100 information with buttons for each user management action that is authorized for that authorized user to manage. Managing system 100 gets the users authorized actions list from the UAMS 101 server, when the user selects the managing system 100 to manage and displays the corresponding buttons for each action 302 is enabled.

Once user selects the user management action button corresponding to modules logout 150, lock 155, change password 160 and user action module 165 in the managing systems 100 to control the actions of the UAMS server 101 for a managing system 100 in the managing system referring to flow chart step 303, then the managing system 100 sends that action notification along with user and managing system information to the appropriate UAMS 101 server referring to flow chart step 304, which manages that managing system 100 and then applies the appropriate action on the specific databases, server applications, computer applications, cloud applications, servers, computers, mobile app, browser plugin, website, etc. identified as a group as item 2 indicated by the managing system 100 command.

UAMS 101 server receives the user action request from the managing server 100. The commands are passed and acknowledged using application 1 and 11 respectively. UAMS 101 server user action module 102 first verifies whether that user is allowed to execute the specified action in the managing system referring to flow chart step 310. If the user is authorized to do the specified action in the managing system 100, then the user action module 102, triggers the appropriate module referring to flow chart step 320. The action modules are implemented so that specific action in different managing systems that are supported are executed. For example, if the action is to logout the user, then the logout module 103 forces the logout of the user from the appropriate managing system 100 as shown in flow chart step 321. If the action is for locking the user account, then the lock module 104 locks the user account in the managing system 100 as shown in flow chart step 322. If the action specified is to change the password for the user account, then the change password module 105 changes the password for the user account in the managing system as shown in flow chart step 323. The commands are passed and acknowledge using application 1 and 11 respectively.

If the user is not authorized to do the action, then UAMS 101 server informs the user in the managing system 100 that they cannot perform that user action 315.

Optionally, if the user action module configures an administration user to manage the other authorized user actions in the managing systems 100, then once the managing system 100 calls to get the command from the managing system 100 from UAMS 101 server. The UAMS 101 server returns the identifiers for all authorized users and corresponding managing systems 100 that the administrator user can manage to the manager app 25 and the manager app 25 displays those lists. When administration user selects to do an action in a managing system on behalf of another user, managing system 100 sends all information along with the other user information to UAMS 101 server. If UAMS 101 server user access module permits, then the UAMS 101 server executes the appropriate actions on behalf of that user.

Further, to insure clarity of the logout module 103: 1. Website function: To logout user from the website, logout module 103 stores the logout request time, then whenever a webpage accessed, the webpage checks whether the current time is greater than the logout request time, then it can logout that user. 2. Computer windows login 110: To logout user from computer login, logout module triggers a command to logout that user from that computer 110. 3. Database 113 login: To logout user from DB, logout module deletes the login session from the DB system tables, which automatically forces logout of the user from the database 113. The commands are passed and acknowledge using application 1 and 11 respectively.

Lock module: 104, 1. Website: To lock user from the website, lock module locks the user account in the user account table. 2. Computer windows login: To lock user from computer or active directory, lock module executes the command to lock the user in the computer or active directory. 3. Database login: To lock user from DB, lock module executes a command to lock the user in the DB system. The commands are passed and acknowledge using application 1 and 11 respectively.

Change password 105: Change password module changes the password by executing appropriate commands in the managing systems. The commands are passed and acknowledge using application 1 and 11 respectively.

Notify User Access: Additionally, UAMS server's 101 user action module 222 monitors the user actions, such as login, logout, user access the system beyond a time limit, lock the account, change password, etc. and notify the users via alarm notification systems 220 using communication methods such as mobile app, browser plugin, email, SMS, etc., where the user registered to receive the alarm notification. Optionally, the managing system 230 calls the UAMS 101 server user action module when the user actions occur in the managing systems with user identifier information. Then, UAMS 101 server notifies the appropriate user by the appropriate alarm notification systems.

If user uses the alarm notification systems, such as mobile apps, browser plugins, etc., user verifies his identities in the alarm notification system by verifying his email address, phone number, etc., which helps to identify the user in the managing systems. Optionally, user can also login into managing system or UAMS 101 server directly from management system to show they authorized to get the notification from the managing system 100.

Once the user verifies his identity in the notification system, the user adds the UAMS 101 server information, where the managing systems 220 connected, in the notification module 224 of managing system 220. This UAMS 101 server information helps the notification module 224 of managing system 220 to get or send the appropriate action/method calls to the UAMS 101 server. A managing system 2 can itself act as a UAMS 101 server, for example a website, acts as a UAMS 101 server itself. A UAMS 101 server can be implemented as a separate server and that connects and manages different managing systems, for example an enterprise user management server manages enterprise computers, servers, databases, websites, etc. Once the user added the UAMS 101 server information in the notification system, the notification system sends the subscription request to the UAMS 101 with the user identifier. UAMS 101 server's user notification info module 224 stores the user identifier with notification system information.

When user action, such as login, logout, user access the system beyond a time limit, lock the account, change password, etc. occurs in a managing system referring to flow chart step 401, either managing systems 230 directly calls the UAMS user action module 222 or UAMS user module monitors the user actions in the managing systems. UAMS user action informs the UAMS 101 user notification info module 224. UAMS 101 user notification info module uses that user identifier to find the appropriate subscribed notification method to inform that user referring to flow chart step 402 and calls the UAMS 101 sends a notification module 223. Then UAMS 101 send notification module 223 generates the appropriate message for that notification system referring to flow chart step 403 and sends that notification to the user's subscribed notification systems referring to flow chart step 404.

Apart from that when a user has changed his/her key notification identifier such as their email address or phone number, the system will cause the system to send the proper notification to the authorized user and will stop sending the intruders the actions notifications. The managing system or UAMS 101 accomplishes this by sending a notification with regards to the changes to the old identifiers to provide notification to the authorized user so they can stop the change of the identifier. After a predetermined period of time and after the selected number of alerts and the user still does not respond to the notification of the change, UAMS 101 will stop sending the notification to the old identifiers. The UAMS 101 sends the user access notification to the old identifiers so that the authorized user is notified of the change.

Optionally, an admin can register to get notification for other users.

Figure 4:
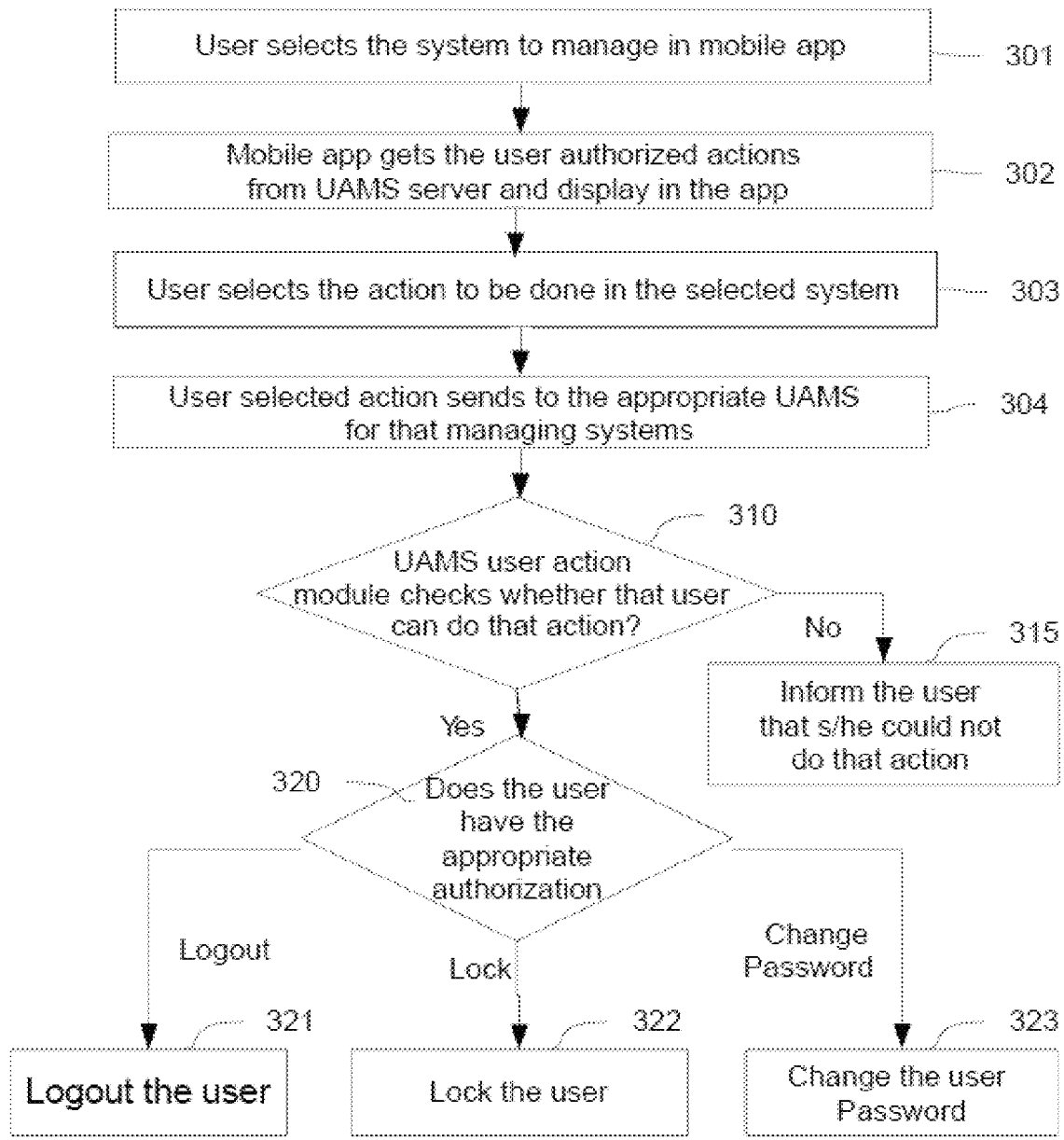
FIG. 4 shows a flow chart for the user access management system (UAMS).

Referring to Flow Chart FIG. 4 which defines the User Access Management from Anywhere module (UAMfA) process.

The first action is step 301 User selects the system to manage in mobile app. Step 301.

The next step is Mobile app gets the user authorized actions from UAMS server and display in the app. Step 302.

User selects the action to be done in the selected system. Step 303.

User selected action sends to the appropriate UAMS for that managing system. Step 304

Next the UAMS user action module checks whether that user can do that action? Step 310 If no, inform the user they do not have authorization. Step 315.

If yes, then Does User have the appropriate authorization. Step 320

If yes, execute the instruction to Log out, Lock the User, or Change the password. Steps 321.322. 323.

Figure 5:
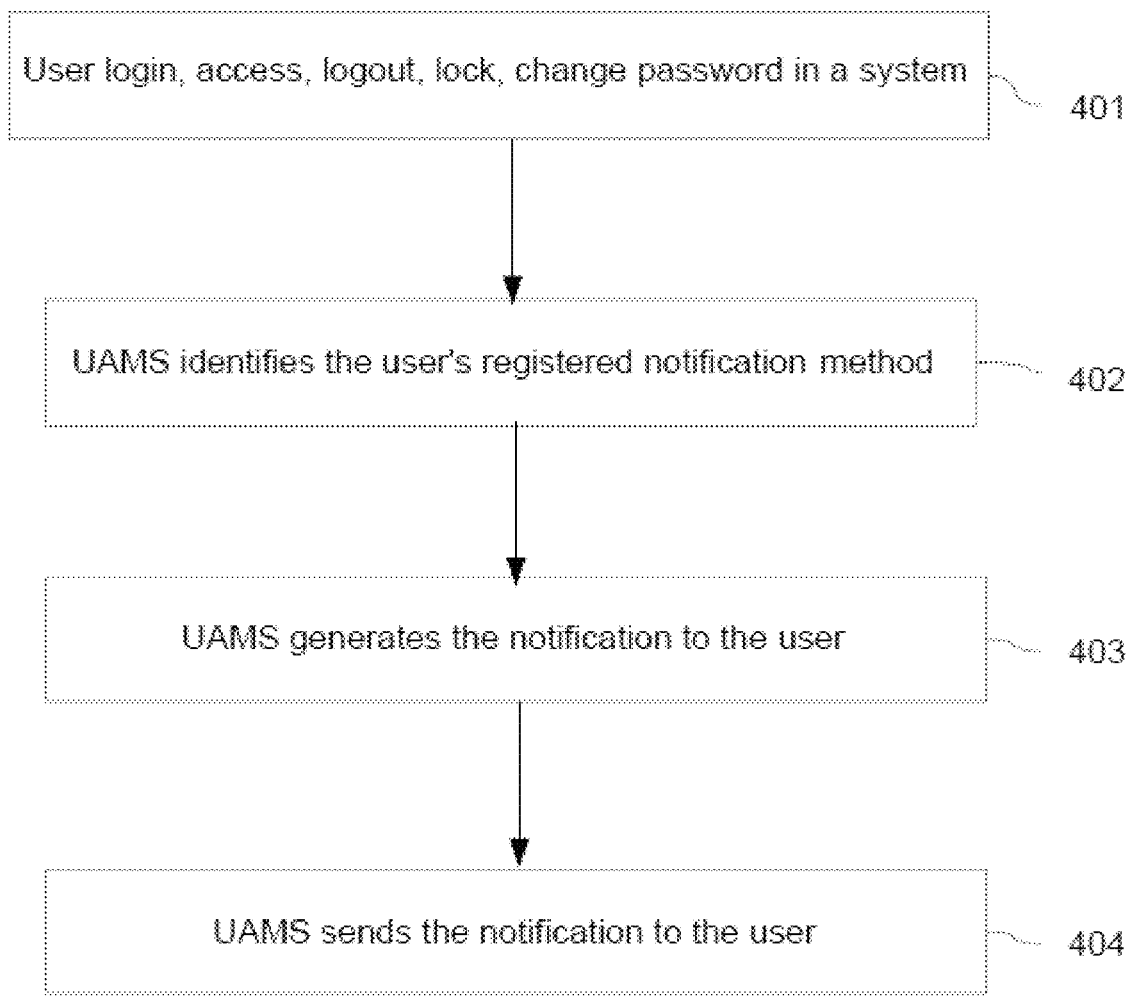
FIG. 5 shows a flow chart for the user access management system (UAMS).

Referring to Flow Chart FIG. 5 which defines the Notify User Access flow.

First User login, access, logout, lock, change password in a system, step 401.

Next, UAMS identifies the user's registered notification method step 402.

Next, UAMS generates the notification to the user, step 403.

Next, UAMS sends the notification to the user, step 404.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

I claim:

1. A method of monitoring access to multiple files, mobile applications, websites, computer applications, servers, computers, and databases remotely from a mobile device to stop access to a target application comprising of multiple files, mobile applications, websites, computer applications, servers, computers, and databases remotely from a mobile device comprising of the: a) installing a first monitoring application into the software of said target application, b) installing a management application onto a server which has a second monitoring application which is in communication with said first monitoring application, c) said first monitoring application monitoring the software of the target application for an event, d) said first monitoring application sending a notification to said second monitoring application when said event occurs, e) said second monitoring application sending a first notification to a user alerting said user to the occurrence of said event, f) said user receiving said event, g) said user initiating an action based on the said event by initiating a response using said management application onto said server which formats a second notification and sends said second notification to said first monitoring application on said software of said target application using said second monitoring application.

2. The method of claim 1, whereas said event is selected from the group consisting of login, locking the user account, logout of the user account, login of the user account, changing password, changing notification email, changing notification phone number, changing contact information, changing security questions, and changing alternate email address.

3. The method of claim 1, whereas said action is selected from the group consisting of logout the user's access, locking the user account, login of the user account, changing the user's password, changing the notification email, changing notification phone number, changing contact information, changing security questions, logging into a computer, and changing alternate email address.

4. The method application of claim 1, whereas said target application is selected from the group consisting of databases, server applications, computer applications, mobile app, browser plugin, and website.

5. A method of monitoring access to multiple files, websites, mobile applications, computer applications, cloud applications, servers, computers, and databases remotely from a mobile device to stop access to a target application comprising of multiple files, mobile applications, websites, computer applications, servers, computers, and databases remotely from a mobile device comprising of the: a) installing a first monitoring application into the software of said target application, b) installing a management application onto a server which has a second monitoring application which is in communication with said first monitoring application, c) said first monitoring application monitoring the software of the target application for an event, d) said first monitoring application sending a notification to said second monitoring application when said event occurs, e) said second monitoring application sending a first alarm notification to a user alerting said user to the occurrence of said event, f) said second monitoring system setting a timer for a predetermined amount of time, f) said predetermined time on said timer expiring, g) said second monitoring application sending a copy of said first notification to a user alerting said user to the occurrence of said event, h) said user initiating an action based on the said event by initiating a response using said management application onto said server which formats a second notification and sends said second notification to said first monitoring application on said software of said target application using said second monitoring application.

6. The method of claim 5, whereas said event is selected from the group consisting of login, accessing the user account, locking the user account, logout of the user account, changing password, changing notification email, changing notification phone number, changing contact information, changing security questions, and changing alternate email address.

7. The method of claim 5, whereas said action is selected from the group consisting of logout the user's access, locking the user account, changing the user's password, login the user account, changing the notification email, changing notification phone number, changing contact information, changing security questions, logging into a computer, and changing alternate email address.

8. The method application of claim 5, whereas said target application is selected from the group consisting of databases, server applications, computer applications, mobile app, browser plugin, and website.

9. The method of claim 5, whereas the predetermined time is selected from the range comprising of 0 minutes to 48 hours.

10. A method of monitoring access to multiple files, mobile applications, websites, computer applications, cloud applications, servers, computers, and databases remotely from a mobile device to stop access to a target application comprising of multiple files, mobile applications, websites, computer applications, servers, computers, and databases remotely from a mobile device comprising of the: a) installing a first monitoring application into the software of said target application, b) installing a management application onto a server which has a second monitoring application which is in communication with said first monitoring application, c) said first monitoring application monitoring the software of the target application for an event, d) determining if said event has occurred, e) setting a first timer for a first predetermined amount of time, f) when said first timer expires said first monitoring application sends a notification to said second monitoring application when said event occurs, g) said second monitoring application sends a first alarm notification to a user alerting said user to the occurrence of said event, h) said second monitoring system setting a second timer for a second predetermined amount of time, i) said second timer expiring, j) when said second timer expires said second monitoring application sending a copy of said first notification to a user alerting said user to the occurrence of said event, k) said user initiating an action based on the said event by initiating a response using said management application onto said server which formats a second notification and sends said second notification to said first monitoring application on said software of said target application using said second monitoring application.

11. The method of claim 10, whereas said event is selected from the group consisting of login, locking the user account, logout of the user account, login of the user account, changing password, changing notification email, changing notification phone number, changing contact information, changing security questions, and changing alternate email address.

12. The method of claim 10, whereas said action is selected from the group consisting of logout the user's access, login the user account, locking the user account, changing the user's password, changing the notification email, changing notification phone number, changing contact information, changing security questions, logging into a computer, and changing alternate email address.

13. The method application of claim 10, whereas said target application is selected from the group consisting of databases, server applications, computer applications, mobile app, browser plugin, and website.

14. The method of claim 10, whereas said first predetermined time is selected from the range comprising of 0 minutes to 48 hours.

15. The method of claim 10, whereas the second predetermined time is selected from the range comprising of 0 minute to 180 minutes.

* * * * *